June 7, 1960 F. D. BACON 2,939,488
FRICTION SHIELD FOR FIRE HOSE
Filed March 4, 1958
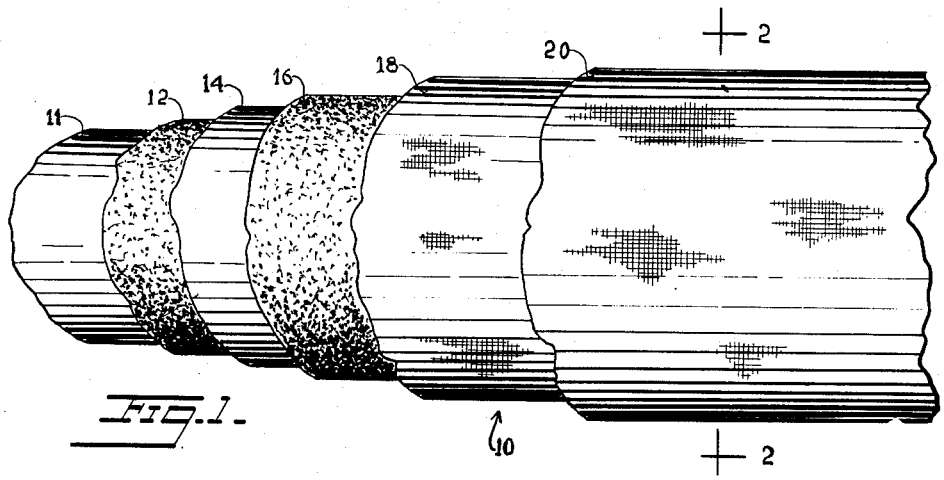
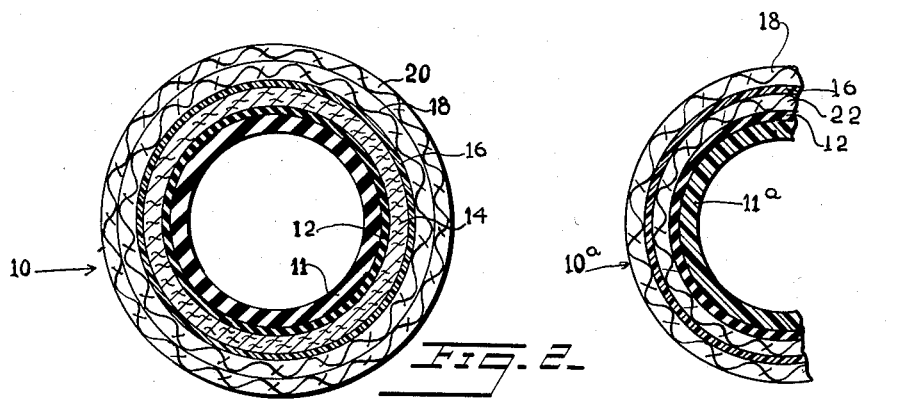
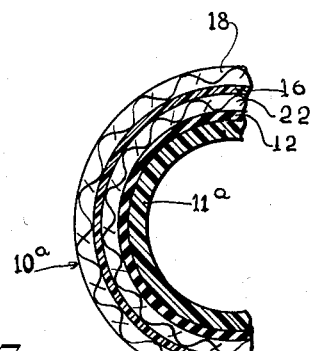
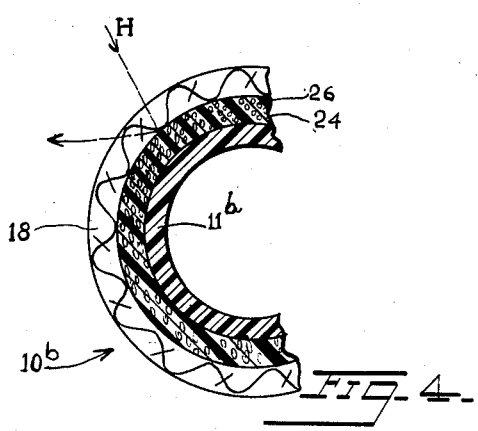
INVENTOR.
FRANCIS DALE BACON
BY
*ATTORNEY*

United States Patent Office 2,939,488
Patented June 7, 1960

2,939,488
FRICTION SHIELD FOR FIRE HOSE
Francis Dale Bacon, 26 Butler St., Westbury, N.Y.
Filed Mar. 4, 1958, Ser. No. 719,019
1 Claim. (Cl. 138—55)

This invention concerns an improved fire hose.

Hoses of the type used by fire departments of municipalities generally consist of a single or double tubular jacket of woven fabric with an inner waterproof tube of natural or synthetic rubber. The rubber tube is bonded to the outer woven jacket which is adapted to withstand the high pressure to which the hose is subjected during use.

Under emergency conditions, a fire hose may be dragged rapidly over concrete, asphalt, and other hard, rough surfaces to put it in position for use. At such times considerable heat of friction is developed in the hose which reaches the inner waterproof tube. Since at such times, the full intensity of the heat is applied to the inner rubber tube which causes premature weakness, cracking, oxidation, and leakage so that the hose becomes unserviceable.

This condition is prevented in accordance with the present invention by providing a heat or thermal shield in the hose between the outer woven jacket and the inner waterproof tube. This shield is made of a heat resistant insulation material such as asbestos, glass cloth, and the like. The shield acts as a heat absorber and/or heat reflector and thus increases the life and serviceability of the hose. In addition, the shield may increase the strength of the hose construction. The invention may be applied to hoses manufactured to standardized specifications for industrial and municipal fire hoses.

The heat shield is bonded to the inner periphery of the woven jacket and to the outer surface of the waterproof tube by suitable bonding means.

It is, therefore, a principal object of the invention to provide a hose with a heat resistant shield bonded between an inner waterproof tube and an outer fabric jacket.

It is a further object to provide a fireproof layer made of asbestos, glass wool, magnesium oxide, vermiculite, rock wool or the like, in a fire hose.

It is a still further object to provide means for insulating a waterproof tube in a hose from frictional heat conducted through an outer woven jacket in the hose.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is an elevational view of a portion of a hose embodying the invention with portions broken away to show internal construction.

Fig. 2 is a cross-sectional view taken on lines 2—2 of Fig. 1.

Fig. 3 is a cross-sectional view similar to Fig. 2 of a portion of a modified construction.

Fig. 4 is a view similar to Fig. 3 of another modified hose construction.

The hose 10 shown in Figs. 1 and 2 has a waterproof inner tube 11 formed of natural or synthetic rubber or a suitable plastic material such as polyethylene, vinyl, or the like. Enclosing the tube 11 is a tubular layer 14 of a material which is a poor heat conductor and is preferably made of an inorganic mineral which is fireproof and flameproof. Such a material may be asbestos, Fiberglas, magnesium oxide, rock wool, etc. The tubular layer acts as a heat shield for the inner tube 11. The shield is bonded to the rubber tube by a suitable adhesive layer 12. One adhesive substance which has been found satisfactory is uncured latex cement. If the inner tube is made of a plastic, the latex will provide an excellent bond since this substance is very tacky. The latex may be of a self-curing type including appropriate compounds for this purpose. While this material is preferred, other equivalent adhesives well known in the art may be used.

A seamless tubular jacket 18 made of woven cotton, Dacron, nylon, or similar material, surrounds the shield 14. This jacket provides the necessary strength for the hose to resist the high water pressures encountered during use of the hose. The shield 14 is bonded to the jacket and vice versa by a heat-proof adhesive layer 16. A preferred adhesive for this purpose is one containing a silicone resin. Silicone adhesives are well known to have excellent heat resistant characteristics. They will retain their bonding characteristics without loss of flexibility under temperatures high enough to cause charring of the outer woven cloth jacket. A second seamless tubular jacket 20 may be provided to reinforce the inner jacket 18.

In Fig. 3, the hose 10ª has a single outer fabric jacket 18. This jacket is bonded to the layer 22. Layer 22 is a heat resistant thermal shield which may be made of any of the materials above mentioned for layer 14. It is shown in Fig. 3 as a woven cloth while the layer 14 in Fig. 2 is shown as a packing material. This is because the thermal shield may be, but need not necessarily have, a woven cloth construction. If the heat shield is formed as a woven cloth tube, it may serve to strengthen the structure of the hose to resist high pressure and other stresses to which the hose is subjected during use. Layer 22 is bonded to the inner waterproof tube 11ª by a waterproof layer 12 of rubber cement or the like. Shield 22 is bonded to jacket 18 by a heat resistant cement layer 16.

The hose 10ᵇ shown in Fig. 4 has a rubber or plastic inner tube 11ᵇ and an outer woven cotton or nylon tube or cover 18. Disposed between the two tubes 11ᵇ and 18 and bonded thereto is a tubular layer 24 of a flexible silicone resin which is a good thermal insulation material. Dispersed in the layer 24 are flakes 26 of a metal such as aluminum or copper. These several flakes are spaced from each other in the resin. These flakes serve to reflect heat rays H which may be generated by rubbing of the outer cover 18 and which would be conducted to the inner tube 11ᵇ in the absence of the heat shield 24. Layer 24 acts as both a heat absorber and reflector because the resin is a good thermal insulation material and the metal particles or flakes 26 overlie each other in the paths of the heat rays to provide a good heat ray reflecting medium. The tube, layer and cover may be bonded to each other by suitable adhesive.

A hose constructed with a thermal shield as described will contribute greatly to lifesaving and fire control by blocking, reflecting and absorbing frictional heat which would otherwise pass through the porous woven outer jacket to the inner waterproof tube with very deleterious effects thereon. The use of the shields thus contributes to more efficient fire control since it will obviate sudden, unexpected bursting or failure of fire hoses in emergencies, where such failures have heretofore been caused by heat weakened inner tubes.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A hose construction, comprising a plurality of concentric flexible tubes, round in cross section, the innermost one of said tubes being adapted to convey water therethrough without leakage, the outermost one of said tubes being formed of seamless woven cloth, and an intermediate one of said tubes being formed of heat absorbing and reflecting material to prevent heat generated by rubbing friction on the outermost tube from reaching the innermost tube, said intermediate tube being bonded to the innermost and outermost tubes, the outermost tube being formed as a double layer of cloth, said innermost tube being made of plastic material, said intermediate tube being formed of woven asbestos cloth material, the bond between the intermediate tube and outermost tube being formed by a silicone cement, and the bond between the intermediate tube and the innermost tube being formed by an uncured rubber latex.

References Cited in the file of this patent

UNITED STATES PATENTS

| | | |
|---|---|---|
| 781,353 | Palmer | Jan. 31, 1905 |
| 888,590 | Coughlin | May 26, 1908 |
| 1,158,995 | Evans | Nov. 2, 1915 |
| 1,175,373 | Noack | Mar. 14, 1916 |
| 2,312,282 | Peet | Feb. 23, 1943 |
| 2,329,836 | Huthsing | Sept. 21, 1943 |
| 2,539,853 | Meyers et al. | Jan. 30, 1951 |
| 2,754,848 | Knowland et al. | July 17, 1956 |

FOREIGN PATENTS

| | | |
|---|---|---|
| 517,814 | Canada | Oct. 25, 1955 |